(12) United States Patent
Perkins et al.

(10) Patent No.: US 10,372,579 B2
(45) Date of Patent: Aug. 6, 2019

(54) FPGA MISMATCHED PACKET STOP FOR A SAFETY SYSTEM

(71) Applicant: Artesyn Embedded Computing, Inc., Tempe, AZ (US)

(72) Inventors: Gary Perkins, Clay Springs, AZ (US); Malcolm J. Rush, Phoenix, AZ (US); Andrew Porter, Phoenix, AZ (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 175 days.

(21) Appl. No.: 15/455,619

(22) Filed: Mar. 10, 2017

(65) Prior Publication Data

US 2018/0260297 A1 Sep. 13, 2018

(51) Int. Cl.
| | |
|---|---|
| *G06F 11/00* | (2006.01) |
| *G06F 11/34* | (2006.01) |
| *H04L 29/06* | (2006.01) |
| *G06F 11/30* | (2006.01) |
| *G06F 11/07* | (2006.01) |
| *G06F 11/277* | (2006.01) |
| *H04L 29/08* | (2006.01) |
| *H04L 29/14* | (2006.01) |

(52) U.S. Cl.
CPC ...... *G06F 11/3409* (2013.01); *G06F 11/0739* (2013.01); *G06F 11/0796* (2013.01); *G06F 11/277* (2013.01); *G06F 11/3013* (2013.01); *G06F 11/3495* (2013.01); *H04L 67/12* (2013.01); *H04L 69/22* (2013.01); *H04L 69/40* (2013.01)

(58) Field of Classification Search
CPC ............... G06F 11/277; G06F 11/0739; G06F 11/0796; G06F 11/1608; G06F 11/1641
See application file for complete search history.

(56) References Cited

U.S. PATENT DOCUMENTS

| | | | |
|---|---|---|---|
| 7,117,301 B1* | 10/2006 | James | ............... G06F 17/30949 711/108 |
| 9,317,359 B2* | 4/2016 | Vaananen | .................. H04L 1/00 |
| 2015/0169424 A1* | 6/2015 | Vaananen | ........... G06F 11/3055 714/36 |
| 2015/0169426 A1* | 6/2015 | Vaananen | ........... G06F 11/3409 714/47.1 |
| 2015/0169427 A1* | 6/2015 | Cornes | ................ G06F 11/1637 714/47.1 |

(Continued)

*Primary Examiner* — Charles Ehne
(74) *Attorney, Agent, or Firm* — Harness, Dickey & Pierce, P.L.C.

(57) ABSTRACT

A fault-tolerant failsafe computer voting system including a first voting module that generates a first key based on a comparison between a first data packet and a copy of a second data packet. The first voting module determines whether the first key and a second key are valid keys. The second data packet is a copy of the first data packet. A second voting module generates the second key based on a comparison between the second data packet and a copy of the first data packet. A processing module generates an outgoing data packet based on the first data packet in response to determining whether the first key and the second key are valid keys. The first voting module is inhibited from generating the second key and the second voting module is inhibited from generating the first key.

53 Claims, 4 Drawing Sheets

(56) References Cited

U.S. PATENT DOCUMENTS

| | | | | |
|---|---|---|---|---|
| 2015/0171893 A1* | 6/2015 | Vaananen | ............... | G06F 11/10 |
| | | | | 714/819 |
| 2015/0172162 A1* | 6/2015 | Vaananen | ............... | H04L 43/50 |
| | | | | 714/715 |
| 2015/0293806 A1* | 10/2015 | Cornes | ................. | B60T 13/665 |
| | | | | 714/47.1 |

* cited by examiner

FPGA MISMATCHED PACKET STOP FOR A SAFETY SYSTEM

FIELD

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A safety application, such as a railway system, may include fault-tolerant failsafe computer systems configured to maintain safe operation of the safety application. The fault-tolerant failsafe computer systems may include a plurality of hardware and software components configured to control operation of safety critical hardware and software associated with the safety application. The safety critical hardware and software are configured to control safety relevant functions of the safety application.

For example, a train riding on the railway system includes a braking system. The braking system is configured to implement at least one safety relevant function, such as a braking function. The braking system includes at least a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

SUMMARY

This section provides a general summary of the disclosure, and is not a comprehensive disclosure of its full scope or all of its features.

A fault-tolerant failsafe computer voting system includes a first voting module that generates a first key based on a comparison between a first data packet and a copy of a second data packet. The first voting module determines whether the first key and a second key are valid keys. The second data packet is a copy of the first data packet. A second voting module generates the second key based on a comparison between the second data packet and a copy of the first data packet. A processing module, in response to determining whether the first key and the second key are valid keys, generates an outgoing data packet based on the first data packet. The first voting module is inhibited from generating the second key and the second voting module is inhibited from generating the first key.

A method for fault-tolerant failsafe computer including receiving a first data packet and generating a second data packet based on a copy of the first data packet. A first key is generated based on a comparison between the first data packet and a copy of the second data packet. It is determined whether the first key and a second key are valid keys. A second key is generated based on a comparison between the second data packet and a copy of the first data packet. In response to the determination of whether the first key and the second key are valid keys, an outgoing data packet is generated based on the first data packet.

A fault-tolerant failsafe computer voting system including a switch module that receives a first data packet and generates a second data packet based on a copy of the first data packet. A first voting module generates a first key based on a comparison between the first data packet and a copy of the second data packet. The first voting module determines whether the first key and a second key are valid keys. A second voting module generates the second key based on a comparison between the second data packet and a copy of the first data packet. A processing module, in response to determining whether the first key and the second key are valid keys, generates an outgoing data packet based on the first data packet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
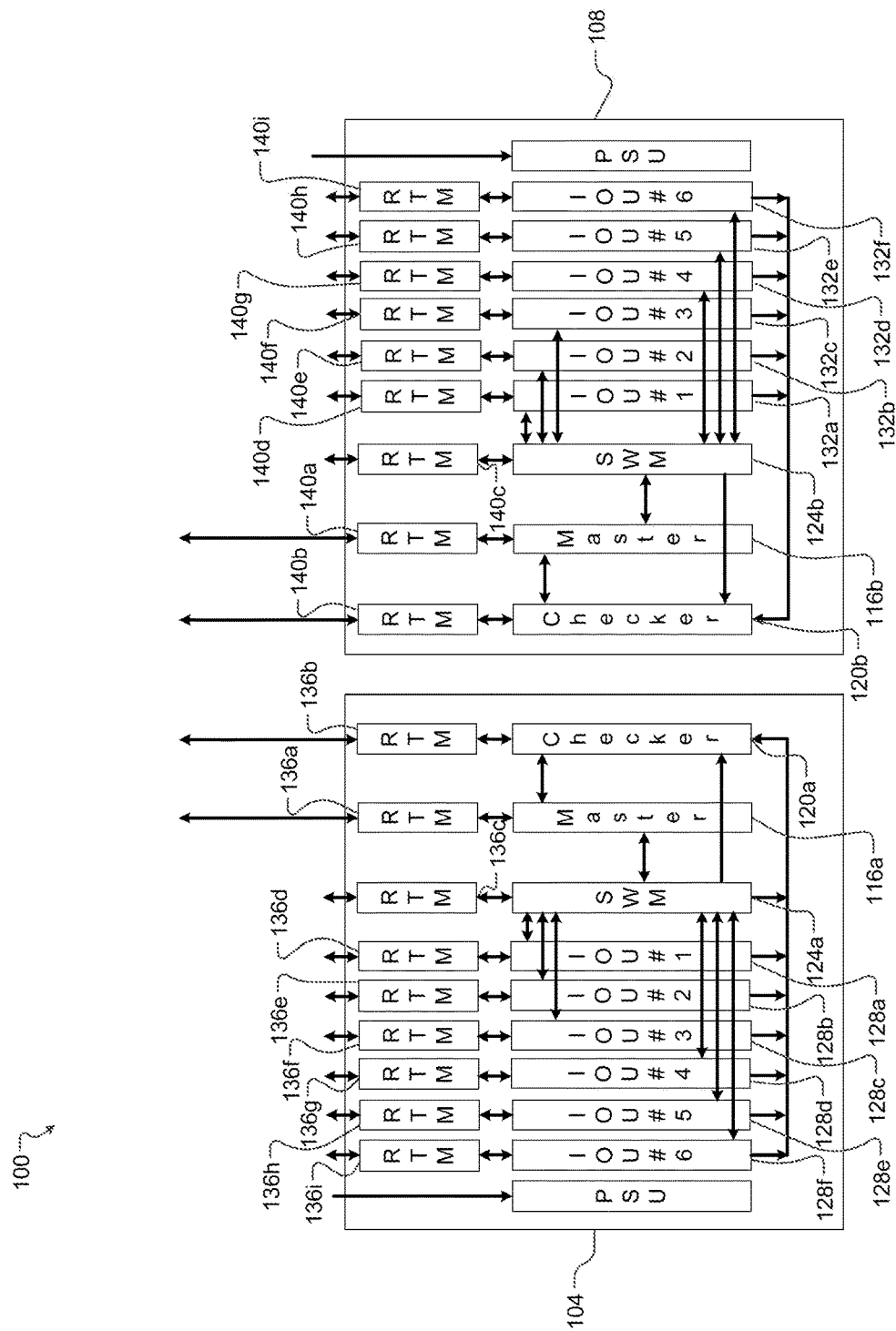
FIG. 1 is a functional block diagram of a fault-tolerant failsafe computer system according to the principles of the present disclosure.

Referring now to FIG. 1, a functional block diagram of an exemplary fault-tolerant failsafe computer system is shown generally at 100. The system 100 is configured to interact with various safety applications (SAs) and/or safety critical systems (SCSs). An SA may comprise a plurality of SCSs interacting and communicating with one and other in order to execute the SA. One example of an SA includes, by way of non-limiting example, a railway system. The railway system includes a plurality of SCSs.

The plurality of SCSs includes, but is not limited to, systems associated with a train operating on the railway system. The system associated with the train may include a braking system, an acceleration system, an alarm system, and/or any other suitable systems associated with the train. The system 100 controls various components of the various SAs and/or SCSs, such as the railway system. The various components include portions of the SAs and SCSs that affect the safety of the SAs and SCSs. These components may be referred to as safety relevant components and may include safety critical hardware and software. By way of non-limiting example, the safety relevant components include components of the braking system, such as a brake and software configured to control the brake.

The safety critical hardware and software receive data elements from the SAs and/or SCs. For example, an operator of the train may desire to apply the brake of the train. The operator interacts with an operator interface, such as by actuating a brake lever. In response to actuating the brake lever, a signal is generated and communicated to safety critical hardware and software that control operation of the braking system.

The system 100 cooperatively operates with the safety critical hardware and software to ensure the components of the railway system, such as the brake, are operating safely. For example, the safety critical hardware and software communicate a data packet based on the brake lever signal. The system 100 validates the data packet. The safety critical hardware and software operate the braking system based on the validation. Other possible applications for the embodiments described herein include, but are not limited to, components of airline systems, components of medical treatment systems, components of oil and gas control systems, components of smart grid systems, and components of various manufacturing systems.

In some implementations, the system 100 receives a plurality of incoming data packets from an SA and/or a SCS, such as the railway system. The system 100 is configured to generate a plurality of outgoing data packets based on the plurality of incoming data packets and communicate the plurality of outgoing data packets to various safety relevant components of the SAs and/or SCSs. For example, as described in detail below, the system 100 determines whether a first packet of the plurality of incoming data packets is a valid packet. When the system 100 determines the first packet is a valid packet, the system 100 generates a first outgoing data packet based on the first packet and communicates the first outgoing packet to at least one safety relevant component of the railway system.

The first incoming packet includes a plurality of data elements control operation of the at least one safety relevant component. The data elements may include sensor data and/or input/output (I/O) point states. The at least one safety relevant component may be the train brake as described above. The plurality of data elements may also control operation of non-safety relevant components of the SA and/or SCS. The incoming data packets are communicated according to a transfer protocol. For example, a component of the railway system may package, or wrap, the incoming data packets according to a predetermined packaging standard. The component of the railway system then transfers and/or communicates the plurality of incoming data packets according to the transfer protocol.

The system 100 is configured to receive packets communicated according to the transfer protocol. Further, the system 100 is configured to interpret or unwrap packets packaged, or wrapped, according to the predetermined packaging standard. In this manner, the system 100 extracts the data elements from the first packet and then generates an outgoing data packet based on the data elements. The outgoing data packet includes a set of instructions based on the data elements. The outgoing data packet may also include operating instruction to control I/Os, a request to read an input in order to gather information, health message communications, a request for inter-process communication, or any other suitable instructions or elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies the brake.

The system 100 determines whether to communicate the outgoing data packet, including the data elements, to the safety critical hardware and software. For example, the system 100 ensures each of the plurality of incoming data packets meet a predetermined safety standard. The predetermined safety standard includes determining whether or not the railway system is operating in a safe manner. The system 100 verifies that each of the plurality of incoming data packets was validly or intentionally transferred by the railway system.

The railway system may communicate erroneous incoming data packets due to a hardware or software fault within the railway system. The system 100 is configured to ensure erroneously communicated data packets are not communicated to the safety critical hardware and software, and thus, are the safety critical hardware and software are not operated according to the erroneous data packets. In other words, the system 100 ensures railway system and/or any other SAs and SCSs operate in a safe manner.

In one example, the safety critical hardware and software receives the first packet of the plurality of incoming data packets. The first packet is generated and communicated in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture.

The safety critical hardware and software communicate the plurality of incoming data packets, including the first and second packet, to the system 100. The system 100 is configured to determine whether each of the plurality of incoming data packets is a valid data packet or was received by the safety critical hardware and software as a result of a fault in the railway system.

When the system 100 determines one of the plurality of incoming data packets was received in response to a command from the operator (i.e., is a valid data packet), the system 100 generates an outgoing data packet corresponding to the received incoming data packet. For example, as described above, the system 100 generates a first outgoing data packet based on the first packet.

The first outgoing data packet includes a set of instructions corresponding to the data elements associated with the first packet. The system 100 communicates the first outgoing data packet to the safety critical hardware and software. The safety critical hardware and software then execute the set of instructions included in the first outgoing data packet. In this manner, the system 100 ensures the safety critical hardware and software only execute valid instructions and/or data elements.

Conversely, when the system 100 determines one of the plurality of incoming data packets was received in response to a fault within the railway system, the system 100 does not generate or communicate an outgoing data packet to the safety critical hardware and software. For example, the system 100 determines the second packet was received due to a fault in the railway system. The system 100 does not generate or communicate an outgoing data packet corresponding to the second packet to the safety critical hardware and software. Consequently, the safety critical hardware and software do not execute instructions corresponding to data elements included in the second packet.

Further, in response to the determination that a packet was received as a result of a fault, the system 100 generates a fault indication. The fault indication may include a fault signal as described in detail below. In this manner, data elements executed by the safety critical hardware and software are first verified as valid by the system 100. The validation ensures the railway system, for example, is operating in a safe manner.

When the system 100 determines the first and second packets are not identical (i.e., voting was unsuccessful), the system 100 disregards the first and second packets and generates the fault indication as described above. The system 100 may also identify one or more components within the SAs and/or SCSs, such as the railway system, as faulty. Conversely, when the system 100 determines the first and second packets are identical (i.e., voting was successful), the system 100, as explained in detail below, adds a key to the first and second packets. The key may be a randomly generated character string or a predetermined character string. The key indicates that voting was successful, and thus, the first and second packets are identical.

The system 100 then determines whether the key added to each of the first and second packets is a valid key. When the system 100 determines the key in the first packet is valid, the system 100 determines whether the key in the second packet is valid. When the system 100 determines the key in the first packet is not valid, the system 100 disregards the first and second packets and generates the fault indication as described above. When the system 100 determines the second key is valid, the system 100 generates a first outgoing data packet based on the first packet and communicates the first outgoing data packet to at least one component of the safety critical hardware and software. The at least one component executes operating data elements included within the first outgoing data packet.

When the system 100 determines the second key is not valid, the system 100 disregards the first and second packets and generates the fault indication as described above. The system 100 may validate the key by comparing the key to a predetermined list of keys, by determining whether the key is a complex key (e.g., a key that is complex is a valid key), or by any other suitable means. A complex key may be a key that is 64-bit or greater. It is understood that the system 100 may determine whether a key is complex based on any suitable complexity definition.

In some implementations, in response to a voting failure, the system 100 generates a safety indication. The safety indication indicates a failure has occurred within the system 100 or the safety critical hardware and software. Further, the system 100 instructs the at least one component to operate in a predetermined safe state in order to maintain the overall safety of the SAs and/or SCSs. The safe state may include the at least one component operating according to a set of safe state data elements configured to maintain a safe operating environment of the railway system.

The safe state data elements include instructing the SAs and or SCSs, such as the railway system, to operate in a manner that ensures the overall safety of the railway system. For example only, the railway system may bring a train operating on the railway system to a stop in response to the safe state data elements. Operating in the safe state may also include disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is executes any and all operations of the standby FSC 108 in the same manner as the FSC 108. In this manner, when one of the active FSC 104 and the standby FSC 108 encounters a hardware or software failure, the other of the active FSC 104 and the standby FSC 108 can operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. In one example, the active FSC 104 receives two copies of a first packet and the second packet of the plurality of incoming data packets.

The active FSC 104 determines the validity of the first packet by comparing the copies of the first and second packets as described above. In other words, the active FSC 104 votes on the first and second packets. The active FSC 104 continuously generates a first health status signal and a second health status signal based on the determination of whether the first packet is valid (i.e., voting was successful). In some implementations, continuously generating a signal may include setting the signal to a first predetermined value. The continuously generated signal is then maintained at the first predetermined value until the signal is de-asserted to a second predetermined value.

The active FSC 104 compares the two copies of the first packet. The active FSC 104 determines the first packet is valid when the two copies are identical. The active FSC 104 continuously generates the first health status signal and the second health status signal when the active FSC 104 determines the first packet is valid. The first and second health status signals may be asserted to a first value. In some implementations, the first value is equal to 1. In another implementation, the first value may be a string of characters that indicate the FSC 104 is healthy.

Conversely, when the active FSC 104 determines the two copies of the first packet are not identical, the active FSC 104 de-asserts the first and second health status signals. The first and second health status signals may be de-asserted to a second value. For example, the second value may be equal to 0. In another implementation, the second value may be a string of characters that indicate the FSC 104 is not healthy. As will be described in greater detail below, the active FSC 104 includes a first processor and a second processor. The first processor continuously generates the first health status signal when the first processor determines the copy of the first packet is valid. Similarly, the second processor continuously generates the second health status signal when the second processor determines the second copy of the first packet is valid.

The active FSC 104 communicates the first and second health status signals to the system 100. The system 100 monitors the first and second health status signal to determine whether the active FSC 104 is healthy. For example, when the system 100 receives the first and second health status signals, the system 100 determines the active FSC 104 is healthy. Conversely, when the system 100 does not receive one of the first health status signal and the second health status signal, the system 100 determines the active FSC 104 is not healthy. It is understood that while only voting mismatches are discussed in relation to the first and second status signals being de-asserted, any hardware or software failure within the system 100 may cause one of the first and second status signals to be de-asserted.

When the active FSC 104 determines that the two copies of the first packet are not identical, the active FSC 104 determines a voting mismatch has occurred. The active FSC 104 generates a fault indication as described above. The fault indication may be a fault signal based on the voting mismatch. The voting mismatch may occur as a result of a fault in the system 100, an SA, and/or an SCSs. For example, the voting mismatch may be due to hardware or software failure within the system 100 or the railway system. For availability reasons, if the active FSC 104 encounters a hardware or software failure, the system 100 forces the active FSC 104 to a predetermined safe state. For example, the system 100 deactivates the active FSC 104. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in overall system architecture. For example, the higher-level equipment may be components of the braking system described above.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100. For example only, the user interface may be implemented as a plurality of light emitting diodes (LEDs).

The communication links communicate with hardware and software components of an SA and/or SCS, such as the railway system. Further, the system 100 receives input and communicates output to a field engineer. For example, the field engineer may selectively configure the system 100 by communicating with the user interface of the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120a, and the checker CPU 120b act to increase the availability and reliability of the system 100.

In order to monitor and control the overall health and safety of the system 100, the master CPU 116a and the checker CPU 120a are also configured to be identical. For example, the master CPUs 116a and the checker CPU 120a execute identical software and implement identical processing functions. The master CPU 116a and the checker CPU 120a are configured to perform identical functions in order to maintain full hardware fault and error detection coverage of the safety critical hardware and software and allow for voting on incoming data packets in the correct sequence.

In some implementations, the plurality of incoming data packets include requests to perform tasks communicated and/or generated by at least one of the safety critical hardware or software of the railway system. The request to perform a task is based on a command received by the safety critical hardware and software from the operator of the SAs and/or SCSs. For example, the operator of the railway system may command a train riding on the railway system to increase speed. The operator may actuate a physical lever within the train. The physical lever is configured to generate a signal indicative of the command to increase the speed of the train. The signal is communicated to the safety critical hardware and software.

Prior to executing the task or tasks, the safety critical hardware and software communicate the task, in the form of an incoming data packet, to the system 100. The system 100 determines whether the task was validity generated. The system 100 determines the validity of a task by voting on the task as described above with respect to the plurality of incoming data packets. When the system 100 determines the task is valid, the system 100 generates an outgoing data packet based on the task. The system 100 communicates the outgoing data packet to the safety critical hardware and software. The safety critical hardware and software executes the task in response to receiving the outgoing data packet.

In one implementation, the system 100 communicates the received packet associated with a requested task to the master CPU 116a. This may be referred to as a master packet. The system 100 communicates a copy of the received packet to the checker CPU 120a. This may be referred to as a checker packet. Both the master CPU 116a and the checker CPU 120a are configured to vote on the validity of the master and checker packets before the safety critical hardware and software execute the requested task associated with the packets.

Each of the master CPU 116a and the checker CPU 120a is configured to communicate a copy of the packet to the other of the master CPU 116a and the checker CPU 120a. In other words, the master CPU 116a receives the master packet from the system 100 and a copy of the checker packet from the checker CPU 120a. Similarly, the checker CPU 120a receives the checker packet from the system 100 and a copy of the master packet from the master CPU 116a. Prior to the master CPU 116a instructing the safety critical hardware and software to perform the requested task associated with the master packet, the master CPU 116a and the checker CPU 120a vote on the master and checker packets by comparing the master packet to the checker packet.

For example, the master CPU 116a compares the master packet to the copy of the checker packet. The master CPU 116a determines whether the master packet and the copy of the checker packet are identical. Similarly, the checker CPU 120a compares the checker packet to the copy of the master packet. The checker CPU 120a determines whether the checker packet and the copy of the master packet are identical.

When the master CPU 116a determines the master packet and the copy of the checker packet are identical, the master CPU 116a adds a key to the master packet. The key may be a character string either predetermined or randomly generated as described above. When the master CPU 116a determines the master packet and the copy of the checker packet are not identical, the master CPU 116a discards the master packet and generates the fault indication as described above.

When the checker CPU 120a determines the checker packet and the copy of the master packet are identical, the checker CPU 120a adds a key to the checker packet. The checker CPU 120a communicates the checker packet with the added key to the master CPU 116a. When the checker CPU 120a determines the checker packet and the copy of the master packet are not identical, the checker CPU 120a discards the checker packet and generates the fault indication.

The master CPU 116a determines whether the key associated with each of the master packet and the checker packet are valid. For example, the master CPU 116a determines whether the master packet key is valid by determining whether the key is a complex key. The master CPU 116a determines the key is valid when the master CPU 116a determines the key is complex. Additionally or alternatively, the master CPU 116a may compare the key to a predetermined list of keys. The master CPU 116a determines the master packet key is valid when the master CPU 116a determines the master packet key is identical to one of the keys in the list of keys.

When the master CPU 116a determines the master packet key is not valid (i.e., a voting mismatch occurred) the master CPU 116a discards the master packet. The master CPU 116a generates the fault indication as described above. When the master CPU 116a determines the master packet key is a valid key, the master CPU 116a then determines whether the checker packet key is a valid key. For example, the master CPU 116a determines whether the checker packet key is valid by determining whether the key is a complex key.

The master CPU 116a determines the checker packet key is valid when the master CPU 116a determines the key is complex. Additionally or alternatively, the master CPU 116a may compare the checker packet key to a predetermined list of keys. The master CPU 116a determines the checker packet key is valid when the master CPU 116a determines the checker packet key is identical to one of the keys in the list of keys. While only limited examples are disclosed, the master CPU 116a may validate the key associated with the master and checker packets by any suitable means.

When the master CPU 116a determines the checker packet key is not valid (i.e., a voting mismatch occurred) the master CPU 116a discards the checker packet. The master CPU 116a generates the fault indication as described above. When the master CPU 116a determines the checker packet key is a valid key (and the master packet key is a valid key), the master CPU 116a generates an outgoing data packet based on the master packet.

The master CPU 116a communicates the outgoing data packet to the safety critical hardware and software. The task associated with the outgoing data packet instructs the safety critical hardware and software to perform the requested task. The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train, for example.

As described above, the fault indication may include a fault signal. The fault signal indicates a failure has occurred within the system 100, the safety critical hardware and software, or the SAs and/or SCSs. By voting on the master packet and the checker packet, the master CPU 116a verifies that the requested task is a valid request from a valid source (i.e., a component of an SA or an SCS, such as the railway system) and not an erroneous request.

For example only, the voting mismatch may be a result of an erroneous request received by the master CPU 116a. The master CPU 116a may receive erroneous requests to perform tasks due to a hardware failure, a software error, or an overall system malfunction. By way of non-limiting example, the master CPU 116a may receive a request to apply the brake in response to a short in an electrical component associated with the brake. It is understood that while only the master CPU 116a and the checker CPU 120a are described, the principles described above also apply to the master CPU 116b and the checker CPU 120b.

Each of the active FSC 104 and the standby FSC 108 include a plurality of input/output unit (IOU) modules. The active FSC 104 includes IOU modules 128a-128f. The IOU modules 128a-128f will hereinafter be referred to as the IOU module 128. Similarly, the standby FSC 108 includes IOU modules 132a-132f, which are identical to the IOU modules 128a-128f. The IOU modules 132a-132f will hereinafter be referred to as the IOU module 132.

The active FSC 104 and the standby FSC 108 also each include a switch module 124a and a switch module 124b respectively. The switch module 124a and the switch module 124b are configured to operate identically. The switch module 124a and the switch module 124b receive the plurality of incoming data packets from the I/O subsystem and route the packets to the master CPUs 116a and 116b and the checker CPUs 120a and 120b.

The switch module 124a also routes packets received from the master CPU 116a to one or more components of an SA and or SCS, such as the railway system. For example, as described above, the master CPU 116a generates outgoing data packets. The master CPU 116a communicates the outgoing data packets to the switch module 124a. The switch module 124a then routes the outgoing data packet to one or more components within the system 100, an SA, or an SCS. Accordingly, the switch module 124a routes outgoing data packets to components of the railway system, such as the safety critical hardware and software. It should be appreciated that while only the switch module 124a is described, the principles described above also apply to the switch module 124b.

The IOU module 128 implements the I/O subsystem within the active FSC 104. The I/O system is configured to provide a gateway between lower-level network equipment and the master CPU 116a and the checker CPU 120a. The IOU module 128 isolates the master CPU 116a and the checker CPU 120a from low level protocols required by external hardware and software. In this way, the IOU module 128 adds a safety layer on the internal Ethernet to support safe communication between the master CPU 116a, checker CPU 120a, and the safety critical hardware and software. The IOU module 128 and the switch module 124a may be referred to collectively as the front blades 124a-128f. Similarly, the IOU module 132 and the switch module 124b may be referred to collectively as the front blades 124b-132f.

The active FSC 104 and the standby FSC 108 also include a plurality of rear transition modules (RTMs). The active FSC 104 includes RTMs 136*a*-136*i*. The standby FSC 108 includes RTMs 140*a*-140*i*. It should be appreciated that because the standby FSC 108 is a redundant configuration of the active FSC 104, the RTMs 136*a*-136*i* are identical to the RTMs 140*a*-140*i*. In some implementations, each of the RTMs 136*a*-136*i* may be hot swappable field replaceable units (FRUs).

For example, each of the RTMs 136*a*-136*i* may be removed and replaced by a field engineer without first having to power off the entire system 100. The RTMs 136*a*-136*i* allows the active FSC 104 to communicate with the safety critical hardware and software components. For example, the RTM 136*a* electrically and logically couples the master CPU 116*a* to components of the railway system. Similarly, the RTM 136*b* electrically and logically couples the standby FSC 108 to safety critical hardware and software components.

The front blades 124*a*-128*f* each includes a first memory location and a second memory location. The first and second memory locations store a value received from a corresponding hardware component of the active FSC 104. For example, the master CPU 116*a* continuously generates a module health signal (described above) indicative of the module health of the master CPU 116*a*. The master CPU 116*a* stores a 1 in the first memory location when the module health signal indicates the master CPU 116*a* is healthy.

Figure 2:
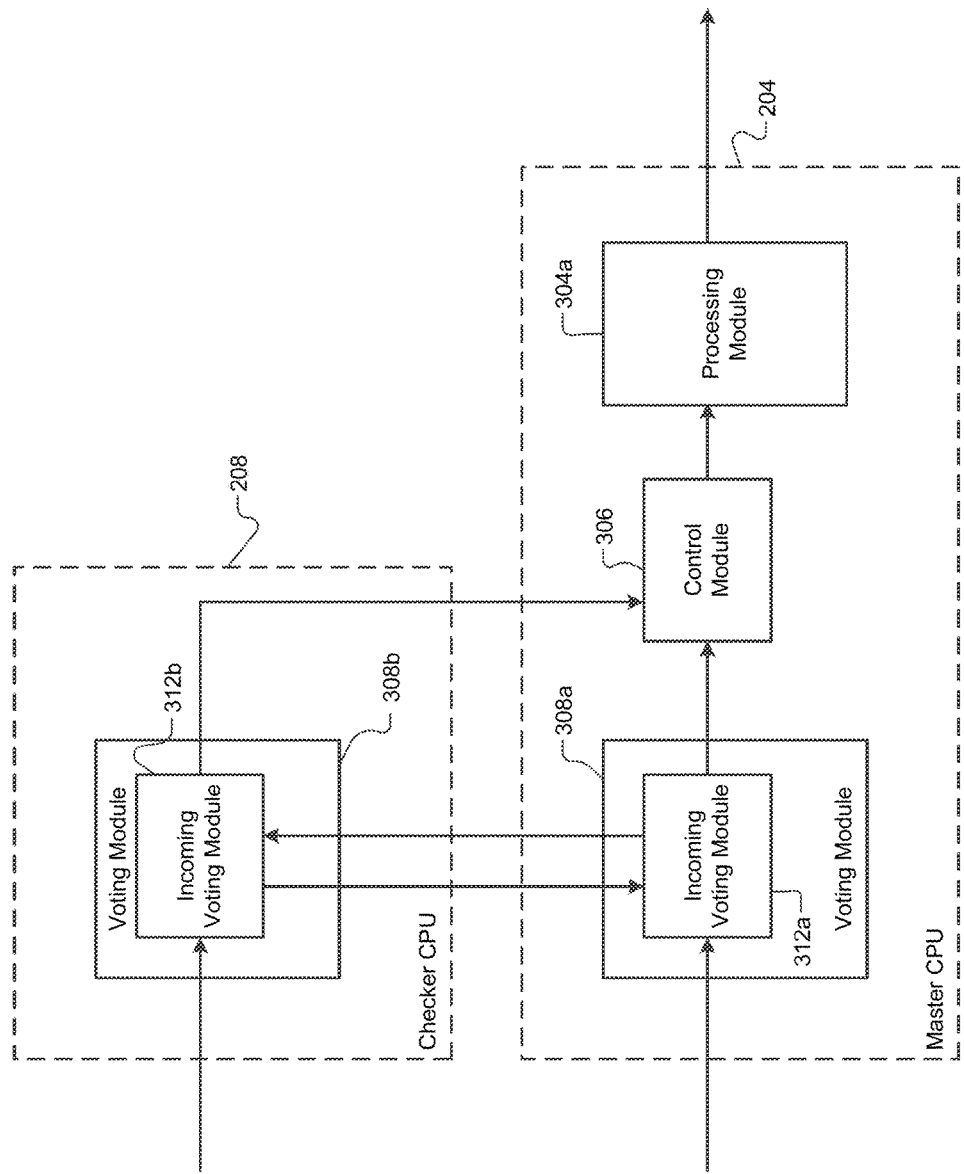
FIG. 2 is a functional block diagram of an example of a fault-tolerant voting system according to the principles of the present disclosure.

With reference to FIG. 2, a functional block diagram of an example implementation of fault-tolerant voting system is shown. The voting system includes a master CPU 204 and a checker CPU 208. The master CPU 204 includes a processing module 304*a*, a control module 306, and a voting module 308*a* and the checker CPU 208 includes a voting module 308*b*. The voting module 308*a* includes an incoming voting module 312*a* and the voting module 308*a* includes an incoming voting module 312*b*. The voting modules 308*a* and 308*b* may be field-programmable gate arrays (FPGA). Similarly, the control module 306 may be an FPGA.

Each of the master CPU 204 and the checker CPU 208 receives a plurality of incoming data packets from an SA and/or SCS, such as the railway system. The voting modules 308*a* and 308*b* are configured to vote on the plurality of incoming data packets and determine the validity of each of the plurality of incoming data packets as described above.

By way of non-limiting example, a component of an SA and/or SCS, such as the railway system, communicates a first packet of the plurality of incoming data packets to a switch module, such as the switch module 124*a* as described with reference to FIG. 1. The first packet may be communicated in response to a command received from a user interface as described above. The switch module 124*a* generates a copy of the first packet. The switch module 124*a* may use port mirroring in order to generate a copy of the first packet. The first packet and the copy of the first packet include identical header information. For example, the first packet and the copy of the first packet use the same MAC address and the same IP address.

In order for the master CPU 204 and the checker CPU 208 to process data packets (i.e., vote on incoming data packets) in same sequence, the master CPU 204 and the checker CPU 208 process received data packets based on the sequence identifier. When the switch module 124*a* generates the copy of the first packet, the switch module 124*a* includes the sequence identifier of the first packet.

The switch module 124*a* communicates the first packet to the incoming voting module 312*a* and the copy of the first packet to the incoming voting module 312*b*. The first packet may be referred to as a master packet and the copy of the first packet is referred to as the checker packet. The incoming voting modules 312*a* and 312*b* determine whether the master packet and the checker packet are valid packets by voting on master packet and the checker packet. For example, the incoming voting modules 312*a* and 312*b* compare the master packet to the checker packet and determine whether the master packet and the checker packet are identical.

In some implementations, the incoming voting module 312*a* is configured to generate a copy of the master packet. The incoming voting module 312*a* communicates the copy of the master packet to the incoming voting module 312*b*. Similarly, the incoming voting module 312*b* is configured to generate a copy of the checker packet. The incoming voting module 312*b* communicates the copy of the checker packet to the incoming voting module 312*a*.

The incoming voting module 312*a* is configured to determine whether the master packet and the copy of the checker packet are valid packets. For example, the incoming voting module 312*a* compares the master packet to the copy of the checker packet. The incoming voting module 312*a* determines whether the master packet and the copy of the checker packet are identical based on the comparison. When the incoming voting module 312*a* determines that the master packet and the copy of the checker packet are not identical, the incoming voting module 312*a* discards the master packet and generates the fault indication as described above. When the incoming voting module 312*a* determines the master packet and the copy of the checker packet are identical, the incoming voting module 312*a* generates a master key.

The master key may be a randomly generated complex character key, a predetermined character key, or any other suitable key. The incoming voting module 312*a* adds the master key to the master packet. The incoming voting module 312*a* may add the master key to the master packet by appending the key to header information within the master packet, updating a key field in the master packet, or any other suitable means. The incoming voting module 312*a* communicates the master packet and the master key to the control module 306. In some examples, the incoming voting module 312*a* communicates the master packet and the master key as separate packets or as a single packet.

The incoming voting module 312*b* is configured to determine whether the checker packet and the copy of the master packet are valid packets. For example, the incoming voting module 312*b* compares the checker packet to the copy of the master packet. The incoming voting module 312*b* determines whether the checker packet and the copy of the master packet are identical based on the comparison. When the incoming voting module 312*a* determines that the checker packet and the copy of the master packet are not identical, the incoming voting module 312*a* discards the checker packet and generates the fault indication as described above. When the incoming voting module 312*b* determines the checker packet and the copy of the master packet are identical, the incoming voting module 312*b* generates a checker key.

The checker key may be a randomly generated complex character key, a predetermined character key, or any other suitable key. The incoming voting module 312*b* adds the checker key to the checker packet. The incoming voting module 312*b* may add the checker key to the checker packet by appending the key to header information within the checker packet, updating a key field in the checker packet, or any other suitable means. The incoming voting module 312*b* communicates the checker packet and the checker key to the control module 306. In some examples, the incoming voting module 312b communicates the checker packet and the checker key as separate packets or as a single packet.

In the example implementation, voting may, for example only, be unsuccessful due to a lost copy of a packet, an erroneously generated packet, or a mismatch in header information of the master packet and checker packet. When one of the incoming voting modules 312a and 312b determine the master and checker packets are not identical (i.e., voting is not successful), the first packet is dropped and nothing is forwarded to the control module 306.

The control module 306 is configured to determine whether voting on the master packet and checker packet was successful. In some implementations, the control module 306 determines voting on the master and checker packet was successful based on a validation of the key associated with the master packet (master key) and the key associated with the checker packet (checker key). For example, the control module 306 determines whether the master key is a valid key. The control module 306 may determine the validity of the master key by comparing the master key to a list of predetermined keys.

When the control module 306 determines the master key is identical to one of the keys in the list of predetermined keys, the control module 306 determines the master key is a valid key. In other implementations, the control module 306 determines whether the master key is a complex key. When the control module 306 determines the master key is a complex key, the control module 306 determines the master key is a valid key. By way of non-limiting example, a complex key may be defined as a key that is at least a 64-bit key or any suitable complexity definition. Further, it is understood that the control module 306 may validate the master and checker keys by any suitable validation means other than those described herein.

When the control module 306 determines the master key is not a valid key, the control module 306 discards the master packet and generates the fault indication. A master key may be invalid due to a voting mismatch in the incoming voting module 312a, the control module 306 may receive erroneous packets due to hardware and software failures, or any other failure or fault within the system 100, an SA, or an SCS. In some examples, a voting mismatch may occur in the incoming voting module 312a.

When a voting mismatch occurs (i.e., voting was unsuccessful), the incoming voting module 312a is configured to discard the master packet, as described above. However, due to a fault within the incoming voting module 312a or another component within the system 100, the master packet may be communicated to the control module 306 erroneously. By validating the master key, the control module 306 ensures erroneously generated packets are not communicated to the safety critical hardware and software. In other words, the control module 306 is configured to provide a redundant packet validation prior to the safety critical hardware and software executing data elements associated with the master packet.

Conversely, when the control module 306 determines the master key is a valid key, the control module 306 determines whether the checker key is a valid key. As described with respect to the master key, the control module 306 determines whether the checker key is valid based on a comparison between the checker key and a list of predetermined keys, by determining whether the checker key is a complex key, or any other suitable validation methods.

When the control module 306 determines the checker key is not a valid key, the control module 306 discards the master packet and generates the fault indication. A checker key may be invalid for any of the reasons describe above with respect to a master key being invalid. Conversely, when the control module 306 determines the checker key is a valid key, the control module 306 removes the key from the master packet and communicates the master packet to the processing module 304a for further processing. While the control module 306 is described as being configured to first determine whether the master key is valid and then determine whether the checker key is valid, the control module 306 may first determine the validity of the checker key or simultaneously determine the validity of the checker and master keys.

The processing module 304a generates an outgoing data packet based on the master packet. For example, the master packet includes data elements to be acted on by at least one safety relevant component of an SA and/or SCS, such as the railway system described with respect to FIG. 1. The processing module 304a generates the outgoing data packet based on the data elements.

The processing module 304a communicates the outgoing data packet to the switch module 124a. The switch module 124a communicates the outgoing data packet to the at least one safety relevant component via the IOU modules 128a-128f as described in detail with respect to FIG. 1. The safety relevant component, such as a component of the safety critical hardware and software, may then operate according to the data elements included in the outgoing data packet. For example, as described above, the safety critical hardware and software may be associated with and a braking system within the railway system. The data elements may instruct the safety critical hardware and software to apply the brake.

Figure 3:
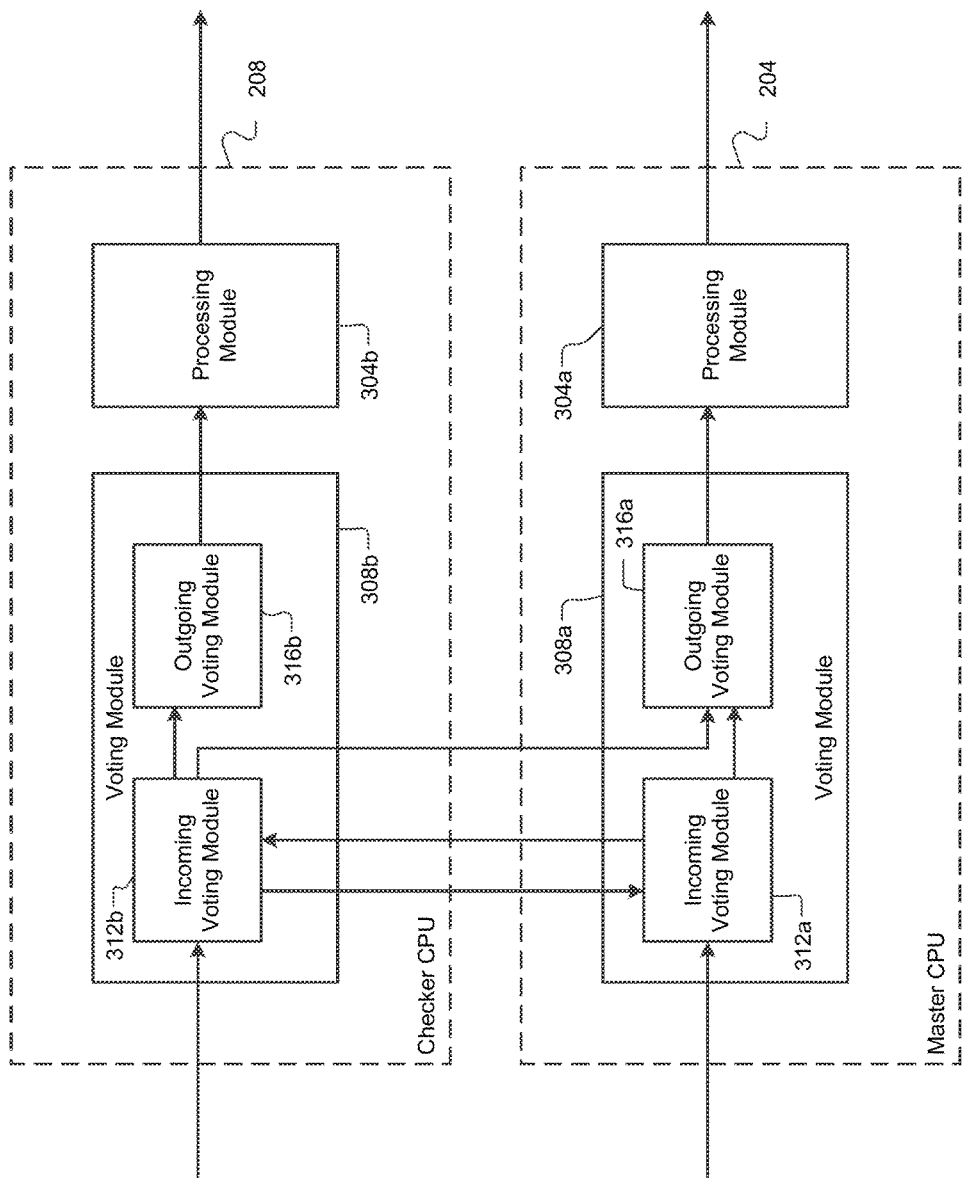
FIG. 3 is a functional block diagram of an alternative example of the fault-tolerant voting system according to the principles of the present disclosure.

With reference to FIG. 3, a functional block diagram of an alternative fault-tolerant voting system is shown. The alternative system includes the master CPU 204 and the checker CPU 208. The master CPU 204 includes a processing module 304a and a voting module 308a and the checker CPU 208 includes a processing module 304b and a voting module 308b. The voting module 308a includes an incoming voting module 312a and an outgoing voting module. The voting module 308a includes an incoming voting module 312b and an outgoing voting module 316b. The voting modules 308a and 308b may be FPGAs. In various embodiments, modules 304a, 304b may be incorporated into respective modules 308a, 308b.

The system 100 may operate in one of a plurality of modes. The plurality of modes may include a normal operating mode, a voting mode, or any other suitable mode of operation. FIG. 3 illustrates signal possible signal paths between the components of the alternative voting system. For example, FIG. 3 illustrates that the incoming voting module 312b may communicate with the outgoing voting module 316b, However, when the system 100 is operating in the voting mode, the outgoing voting module 316b and the processing module 304b do not receive or transmit (communicate) data packets and/or signals. The outgoing voting module 316b and the processing module 304b are merely shown in order to illustrate the redundant nature of the checker CPU 208.

Each of the master CPU 204 and the checker CPU 208 receives a plurality of incoming data packets as described above. The voting modules 308a and 308b are configured to vote on the plurality of incoming data packets and determine the validity of each of the plurality of incoming data packets as described above with reference to FIG. 2.

As described above, the switch module 124a communicates the master packet to the incoming voting module 312a and the checker packet to the incoming voting module 312*b*. The incoming voting modules 312*a* and 312*b* determine whether the master packet and the checker packet are valid packets by voting on master packet and the checker packet. As described above with reference to FIG. 2, the incoming voting module 312*a* is configured to generate a copy of the master packet. The incoming voting module 312*a* communicates the copy of the master packet to the incoming voting module 312*b*.

Similarly, the incoming voting module 312*b* is configured to generate a copy of the checker packet. The incoming voting module 312*b* communicates the copy of the checker packet to the incoming voting module 312*a*. The incoming voting module 312*a* is configured to determine whether the master packet and the copy of the checker packet are valid packets. The incoming voting module 312*a* compares the master packet to the copy of the checker packet. The incoming voting module 312*a* determines whether the master packet and the copy of the checker packet are identical based on the comparison.

When the incoming voting module 312*a* determines that the master packet and the copy of the checker packet are not identical, the incoming voting module 312*a* discards the master packet and generates the fault indication as described above. When the incoming voting module 312*a* determines the master packet and the copy of the checker packet are identical, the incoming voting module 312*a* generates the master key as described above. The incoming voting module 312*a* adds the master key to the master packet. The incoming voting module 312*a* communicates the master packet and the master key to the outgoing voting module 316*a*.

The incoming voting module 312*b* is configured to determine whether the checker packet and the copy of the master packet are valid packets. The incoming voting module 312*b* compares the checker packet to the copy of the master packet. The incoming voting module 312*b* determines whether the checker packet and the copy of the master packet are identical based on the comparison.

When the incoming voting module 312*a* determines that the checker packet and the copy of the master packet are not identical, the incoming voting module 312*a* discards the checker packet and generates the fault indication. When the incoming voting module 312*b* determines the checker packet and the copy of the master packet are identical, the incoming voting module 312*b* generates the checker key. The incoming voting module 312*b* adds the checker key to the checker packet. The incoming voting module 312*b* communicates the checker packet and the checker key to the outgoing voting module 316*a*.

The outgoing voting module 316*a* is configured to determine whether voting on the master packet and checker packet was successful. In some implementations, the outgoing voting module 316*a* determines voting on the master and checker packet was successful based on a validation of the key associated with the master packet (master key) and the key associated with the checker packet (checker key). For example, the outgoing voting module 316*a* determines whether the master key is a valid key. The outgoing voting module 316*a* may determine the validity of the master key by comparing the master key to a list of predetermined keys.

When the outgoing voting module 316*a* determines the master key is identical to one of the keys in the list of predetermined keys, the outgoing voting module 316*a* determines the master key is a valid key. In other implementations, the outgoing voting module 316*a* determines whether the master key is a complex key. When the outgoing voting module 316*a* determines the master key is a complex key, the outgoing voting module 316*a* determines the master key is a valid key. When the outgoing voting module 316*a* determines the master key is not a valid key, the outgoing voting module 316*a* discards the master packet and generates the fault indication. In some examples, a voting mismatch may occur in the incoming voting module 312*a*. When a voting mismatch occurs (i.e., voting was unsuccessful), the incoming voting module 312*a* is configured to discard the master packet, as described above. However, due to a fault within the incoming voting module 312*a*, or another component within the system 100, the master packet may be communicated to the outgoing voting module 316*a* erroneously.

By validating the master key, the outgoing voting module 316*a* ensures erroneously generated packets are not communicated to the safety critical hardware and software. In other words, the outgoing voting module 316*a* is configured to provide a redundant packet validation prior to the safety critical hardware and software executing data elements associated with the master packet.

When the outgoing voting module 316*a* determines the master key is a valid key, the outgoing voting module 316*a* determines whether the checker key is a valid key. As described with respect to the master key, the outgoing voting module 316*a* determines whether the checker key is valid based on a comparison between the checker key and a list of predetermined keys, by determining whether the checker key is a complex key, or any other suitable validation methods.

When the outgoing voting module 316*a* determines the checker key is not a valid key, the outgoing voting module 316*a* discards the master packet and generates the fault indication. Conversely, when the outgoing voting module 316*a* determines the checker key is a valid key, the outgoing voting module 316*a* removes the key from the master packet and communicates the master packet to the processing module 304*a* for further processing. While the outgoing voting module 316*a* is described as being configured to first determine whether the master key is valid and then determine whether the checker key is valid, the outgoing voting module 316*a* may first determine the validity of the checker key or simultaneously determine the validity of the checker and master keys.

The processing module 304*a* generates an outgoing data packet based on the master packet as described above. The outgoing data packet includes data elements associated with the master packet. In various embodiments, the outgoing data packet may include only the data elements associated with the master packet.

The processing module 304*a* communicates the outgoing data packet to the switch module 124*a*. The switch module 124*a* communicates the outgoing data packet to the at least one safety relevant component via the IOU modules 128*a*-128*f* as described in detail with respect to FIG. 1. The safety relevant component, such as a component of the safety critical hardware and software, may then operate according to the data elements included in the outgoing data packet. For example, as described above, the safety critical hardware and software may be associated with and a braking system within the railway system. The data elements may instruct the safety critical hardware and software to apply the brake.

Figure 4:
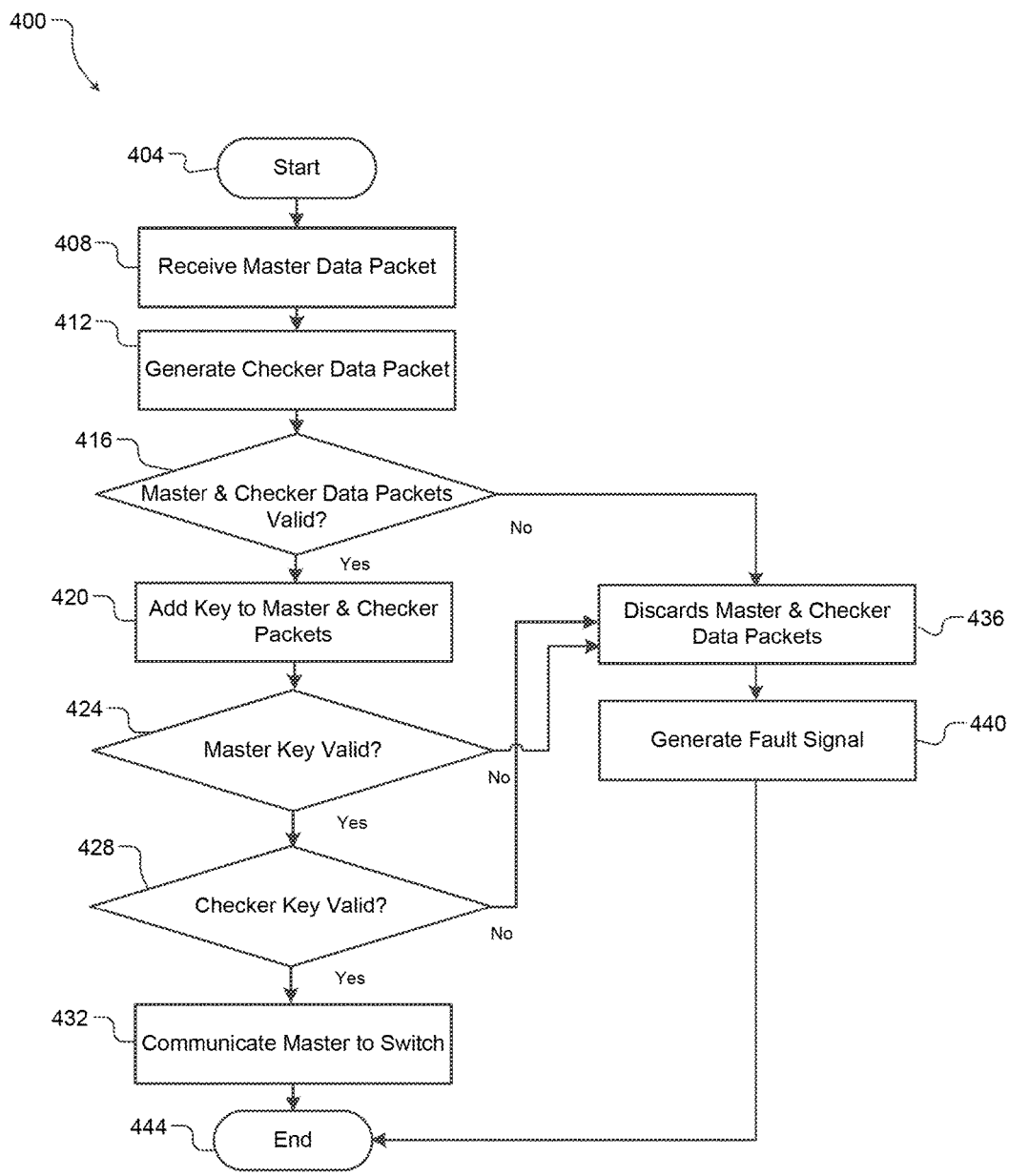
FIG. 4 is a flow diagram illustrating fault-tolerant voting method according to the principles of the present disclosure.

With particular reference to FIG. 4, a flow diagram illustrating an example fault-tolerant voting method 400 starts at 404. At 408, the method 400 receives a data packet, such as the master data packet described above. For example, the switch module 124*a* may receive the master packet. At 412, the method 400 generates a copy of the master packet. The copy of the master packet may be referred to as the checker packet. The switch module 124a may generate the copy of the master packet (i.e., the checker packet).

At 416, the method 400 determines whether the master packet and the checker packet are valid. As described above, the incoming voting modules 312a and 312b exchange copies of the master and checker packets respectively. Each of the incoming voting modules 312a and 312b determine whether the master packet and the checker packet are identical.

If true, the method 400 continues at 420. If false, the method 400 continues at 436. At 436, the method 400 discards the master and/or checker packets. At 440, the method 400 generates the fault indication described above. The method 400 ends at 444.

At 420, the method 400 adds the master key to the master packet and the checker key to the checker packet as described above. At 424, the method 400 determines whether the master key is valid. For example, the control module 306 may determine whether the master key is valid in any manner described above. In an alternative implementation, the outgoing voting module 316a determines whether the master key is valid in any manner described above. If false, the method 400 continues at 436. If true, the method 400 continues at 428.

At 428, the method 400 determines whether the checker key is valid. For example, the control module 306 determines whether the checker key is valid in any manner described above. In the alternative implementation, the outgoing voting module 316a determines whether the checker key is valid in any manner described above. If false, the method 400 continues at 436. If true, the method 400 continues at 432.

At 432, the method 400 communicates the master packet to the processing module 304a. The processing module 304a generates an outgoing data packet based on the master packet and communicates the outgoing data packet to the switch module 124a. The switch module 124a communicates the outgoing data module to the safety critical hardware and software. The safety critical hardware and software operate according to the data elements associated with the outgoing data packet.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fault-tolerant failsafe computer voting system comprising:
    a first voting module that generates a first key based on a comparison between a first data packet and a copy of a second data packet and that determines whether the first key and a second key are valid keys, wherein the second data packet is a copy of the first data packet;
    a second voting module that generates the second key based on a comparison between the second data packet and a copy of the first data packet; and
    a processing module that, in response to determining whether the first key and the second key are valid keys, generates an outgoing data packet based on the first data packet, and
    wherein the first voting module is inhibited from generating the second key and the second voting module is inhibited from generating the first key.

2. The system of claim 1 wherein the first voting module includes a first incoming voting module and an outgoing voting module and wherein the second voting module includes a second incoming voting module.

3. The system of claim 2 wherein the first incoming voting module generates the first key in response to the first incoming voting module determining that the first data packet is identical to the copy of the second data packet and wherein the first incoming voting module communicates the first data packet and the first key to the outgoing voting module.

4. The system of claim 3 wherein the second incoming voting module generates the second key in response to the second incoming voting module determining that the second data packet is identical to the copy of the first data packet and wherein the second incoming voting module communicates the second data packet and the second key to the outgoing voting module.

5. The system of claim 4 wherein the incoming voting module also communicates to the outgoing voting module a sequence number determined in accordance with the second data packet.

6. The system of claim 5 wherein the outgoing voting module determines if the first data packet is valid based on the first key and the second key.

7. The system of claim 5 wherein the outgoing voting module determines if the first data packet is valid based also on the sequence number.

8. The system of claim 7 wherein the outgoing voting module determines whether the first key is a valid key based on a determination that the first key is a complex key and wherein the outgoing voting module determines whether the second key is a valid key based on a determination that the second key is a complex key.

9. The system of claim 4 wherein the outgoing voting module determines if the first data packet is valid based on the first key and the second key.

10. The system of claim 9 wherein the outgoing voting module determines if the first data packet is valid also based on a sequence number.

11. The system of claim 10 wherein the outgoing voting module determines whether the first key is a valid key based on a determination that the first key is a complex key and wherein the outgoing voting module determines whether the second key is a valid key based on a determination that the second key is a complex key.

12. The system of claim 1 wherein the processing module communicates the outgoing data packet to at least one safety relevant component of a safety application.

13. The system of claim 12 wherein the outgoing data packet is the second data packet.

14. The system of claim 12 wherein the at least one component operates according to one or more data elements associated with the outgoing data packet.

15. The system of claim 1 wherein the first voting module discards the first data packet and generates a fault indication based on the first voting module determining that the first data packet and the copy of the second data packet are not identical.

16. The system of claim 1 wherein the second voting module discards the second data packet and generates a fault indication based on the second voting module determining that the second data packet and the copy of the first data packet are not identical.

17. The system of claim 1 wherein the first voting module discards the first data packet and generates a fault indication based on the first voting module determining that one of the first and second keys is not a valid key.

18. A method for fault-tolerant failsafe computer comprising:
receiving a first data packet and generating a second data packet based on a copy of the first data packet;
generating a first key based on a comparison between the first data packet and a copy of the second data packet and determining whether the first key and a second key are valid keys;
generating the second key based on a comparison between the second data packet and a copy of the first data packet; and
in response to the determination of whether the first key and the second key are valid keys, generating an outgoing data packet based on the first data packet.

19. A method of claim 18 further comprising inhibiting generation of the first key based on the first data packet and a copy of the second data packet and inhibiting generating the second key based on the second data packet and a copy of the first data packet.

20. The method of claim 18 further comprising generating the first key in response to determining that the first data packet is identical to the copy of the second data packet and communicating the first data packet and the first key.

21. The method of claim 20 further comprising generating the second key in response to determining that the second data packet is identical to the copy of the first data packet and communicating the second data packet and the second key.

22. The method of claim 21 further comprising communicating to the outgoing voting module a sequence number determined in accordance with the second data packet.

23. The method of claim 22 further comprising determining whether the first data packet is valid based on the first key and the second key.

24. The method of claim 23 further comprising determining if the first data packet is valid based also on the sequence number.

25. The method of claim 24 further comprising determining whether the second key is a valid key based on a determination that the second key is a complex key and wherein the outgoing voting module determines whether the second key is a valid key based on a determination that the second key is a complex key.

26. The method of claim 21 further comprising determining whether the first data packet is valid based on the first key and the second key.

27. The method of claim 26 further comprising determining if the first data packet is valid based also on the sequence number.

28. The method of claim 27 further comprising determining whether the second key is a valid key based on a determination that the second key is a complex key and wherein the outgoing voting module determines whether the second key is a valid key based on a determination that the second key is a complex key.

29. The method of claim 21 further comprising determining whether the first key is a valid key based on a determination that the first key is a complex key and determining whether the second key is a valid key based on a determination that the second key is a complex key.

30. The method of claim 18 further comprising communicating the outgoing data packet to a switch module and wherein the switch module communicates the outgoing data packet to at least one safety relevant component of a safety application.

31. The method of claim 30 further comprising operating at least one component according to one or more data elements associated with the outgoing data packet.

32. The method of claim 31 wherein the outgoing data packet is the second data packet.

33. The method of claim 18 further comprising disregarding the first data packet and generating a fault indication based on determining that the first data packet and the copy of the second data packet are not identical.

34. The method of claim 18 further comprising disregarding the second data packet and generating a fault indication based on determining that the second data packet and the copy of the first data packet are not identical.

35. The method of claim 18 further comprising disregarding the first data packet and generating a fault indication based on determining that one of the first and second keys is not a valid key.

36. A fault-tolerant failsafe computer voting system comprising:
a switch module that receives a first data packet and generates a second data packet based on a copy of the first data packet;
a first voting module that generates a first key based on a comparison between the first data packet and a copy of the second data packet and that determines whether the first key and a second key are valid keys;
a second voting module that generates the second key based on a comparison between the second data packet and a copy of the first data packet; and
a processing module that, in response to determining whether the first key and the second key are valid keys, generates an outgoing data packet based on the first data packet.

37. The system of claim 36 wherein the first voting module is inhibited from generating the second key and the second voting module is inhibited from generating the first key.

38. The system of claim 36 wherein the first voting module includes a first incoming voting module and an outgoing voting module and wherein the second voting module includes a second incoming voting module.

39. The system of claim 38 wherein the first incoming voting module generates the first key in response to the first incoming voting module determining that the first data packet is identical to the copy of the second data packet and wherein the first incoming voting module communicates the first data packet and the first key to the outgoing voting module.

40. The system of claim 39 wherein the second incoming voting module generates the second key in response to the second incoming voting module determining that the second data packet is identical to the copy of the first data packet and wherein the second incoming voting module communicates the second data packet and the second key to the outgoing voting module.

41. The system of claim 40 wherein the incoming voting module also communicates to the outgoing voting module a sequence number determined in accordance with the second data packet.

42. The system of claim 41 wherein the outgoing voting module determines if the first data packet is valid based on the first key and the second key.

43. The system of claim 41 wherein the outgoing voting module determines if the first data packet is valid based also on the sequence number.

44. The system of claim 43 wherein the outgoing voting module determines whether the first key is a valid key based on a determination that the first key is a complex key and wherein the outgoing voting module determines the second key is a valid key based on a determination that the second key is a complex key.

45. The system of claim 40 wherein the outgoing voting module determines if the first data packet is valid based on the first key and the second key.

46. The system of claim 45 wherein the outgoing voting module determines if the first data packet is valid also based on the sequence number.

47. The system of claim 46 wherein the outgoing voting module determines whether the first key is a valid key based on a determination that the first key is a complex key and wherein the outgoing voting module determines whether the second key is a valid key based on a determination that the second key is a complex key.

48. The system of claim 36 wherein the processing module communicates the outgoing data packet to the switch module and wherein the switch module communicates the outgoing data packet to at least one safety relevant component of a safety application.

49. The system of claim 48 wherein the outgoing data packet is the second data packet.

50. The system of claim 36 wherein the at least one component operates according to one or more data elements associated with the outgoing data packet.

51. The system of claim 36 wherein the first voting module discards the first data packet and generates a fault indication based on the first voting module determining that the first data packet and the copy of the second data packet are not identical.

52. The system of claim 36 wherein the second voting module discards the second data packet and generates a fault indication based on the second voting module determining that the second data packet and the copy of the first data packet are not identical.

53. The system of claim 36 wherein the first voting module discards the first data packet and generates a fault indication based on the first voting module determining that one of the first and second keys is not a valid key.

* * * * *